United States Patent [19]

Liu

[11] Patent Number: 6,130,879

[45] Date of Patent: Oct. 10, 2000

[54] ACCESS AND SETUP PROCESS FOR END-TO-END DATA AND ANALOG VOICE CONNECTIONS

[75] Inventor: Ming-Kang Liu, Cupertino, Calif.

[73] Assignee: Integrated Telecom Express, Santa Clara, Calif.

[21] Appl. No.: 08/934,839

[22] Filed: Sep. 22, 1997

[51] Int. Cl.[7] ........................................... H04J 3/22
[52] U.S. Cl. ........................................ 370/230; 370/465
[58] Field of Search ........................... 370/230, 232–235, 370/465, 468, 410, 545

[56] References Cited

U.S. PATENT DOCUMENTS

| | | | |
|---|---|---|---|
| 4,736,364 | 4/1988 | Basso et al. | 370/68.1 |
| 4,985,891 | 1/1991 | Fujiwara et al. | 370/110.1 |
| 5,023,869 | 6/1991 | Grover et al. | 370/465 |
| 5,375,124 | 12/1994 | D'Ambrogio et al. | 370/110.1 |
| 5,550,802 | 8/1996 | Worsley et al. | 370/13 |
| 5,566,301 | 10/1996 | Koz et al. | 709/250 |
| 5,742,610 | 4/1998 | Natarajan | 370/545 |
| 5,872,775 | 2/1999 | Saints et al. | 370/468 |
| 5,907,555 | 5/1999 | Raith | 370/468 |
| 5,914,950 | 6/1999 | Tiedemann, Jr. et al. | 370/335 |

*Primary Examiner*—Chi H. Pham
*Assistant Examiner*—Maikhana Tran
*Attorney, Agent, or Firm*—Law +

[57] ABSTRACT

A signaling protocol process is described for setting up and controlling end to end data link connections. An optimal data path can be selected and configured by a digital subscriber loop (DSL) user based on particular bandwidth requirements, data rate cost constraints, and/or data delay requirements. The data path can be set up to include one or more data routes, including through a regular digital public switching telephone network (PSTN), various kinds of wide area networks (WANs), and virtual permanent circuit links via digital cross-connects (DCS).

20 Claims, 7 Drawing Sheets

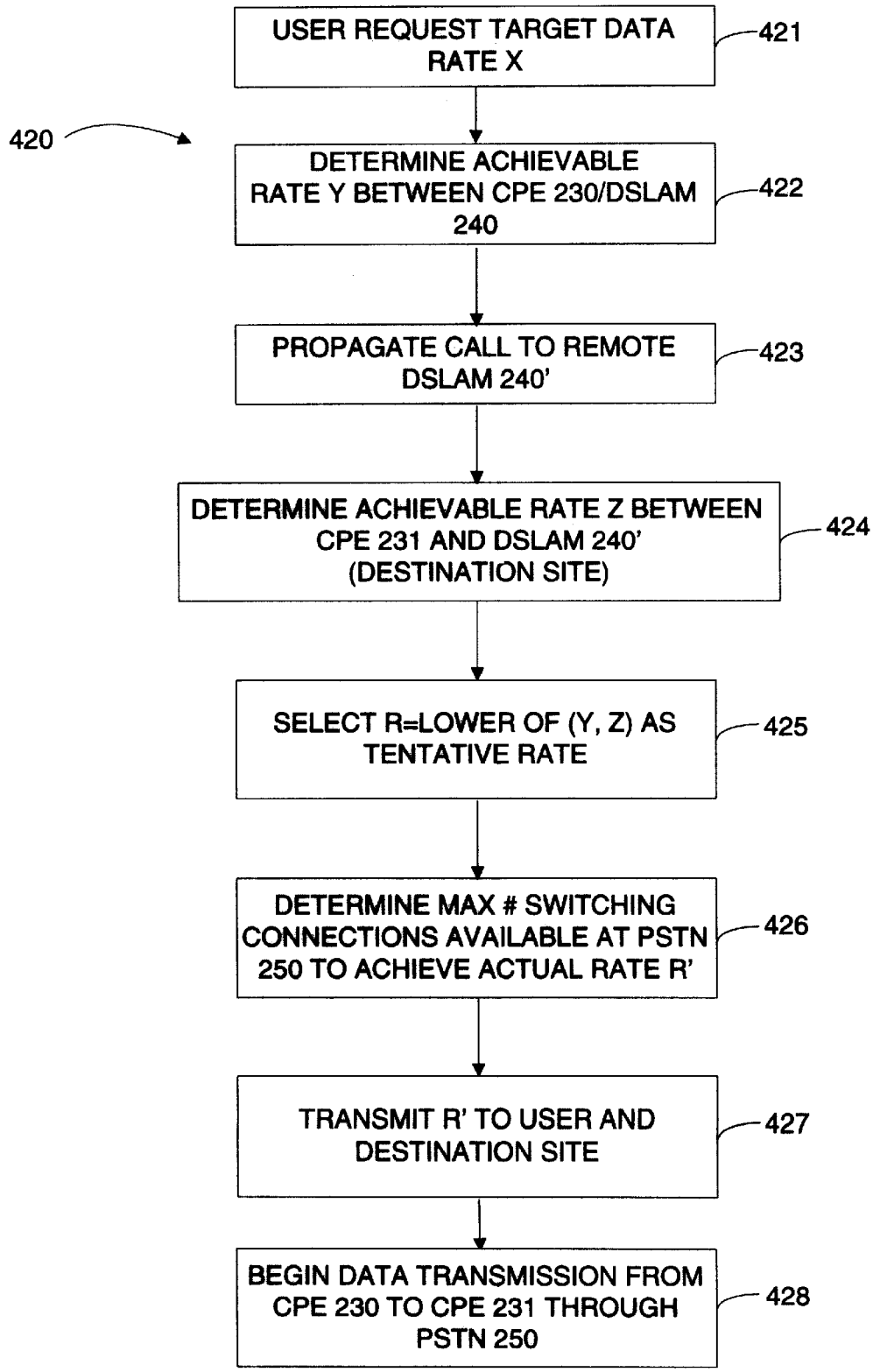

ACCESS AND SETUP PROCESS FOR END-TO-END DATA AND ANALOG VOICE CONNECTIONS

CROSS REFERENCE TO RELATED APPLICATIONS

The present application is related to the following additional applications filed concurrently herewith:

Attorney Docket No. ITE 97-013 entitled "Configurable Digital Subscriber Loop Access and End-to-End Data and Analog Voice Connection System."

Attorney Docket No. ITE 97-014 entitled "Digital Subscriber Loop Access Circuit for Digital Switch and Packet Network Interconnections."

FIELD OF THE INVENTION

The invention relates generally to an access, setup and configuration process for setting up and dynamically configuring an optimal data path routing for an end-to-end data link connection. In particular, the present invention permits a digital subscriber loop (DSL) user, based on total bandwidth requirements, cost requirements, and/or data delay requirements, to optimally configure an end-to-end data path using one or more data routes, including through a regular digital public switching telephone network (PSTN), various kinds of wide area network (WAN), and virtual permanent circuit links via digital cross-connects (DCS).

BACKGROUND OF THE INVENTION

To provide high bit rate transmission over existing telephone subscriber loops, various modem technologies have been proposed. One of the promising solutions is the Asymmetric Digital Subscriber Loop (ADSL) technology that can provide up to 6.144 Mb/s transmission from the central office to a subscriber (downstream) and up to 640 kb/s transmission from the subscriber to the central office (upstream).

As the DSL technology rapidly advances, there is a strong need for the carrier (i.e. phone companies) to provide cost-effective, end-to-end, and high-speed interconnection. However, as explained below, there are many complex issues arising at both the upstream and downstream sites that make it difficult to develop cost-effective and easy-to-install and use solutions.

First, because of the earlier PCM (pulse code modulation) design where analog voice is digitized at a rate of 64 kb/s, the digital telephone switches installed in the Public Switched Telephone Network (PSTN) currently provide only 64 kb/s end-to-end connections. For example, ISDN is a DSL technology that can provide end-to-end circuit switching at a rate of multiple 64 kb/s. Each 64 kb/s link in ISDN is called a B channel and users who want a circuit connection at a rate higher than 64 kb/s needs to use multiple 64 kb/s links at the same time. In this case, all source signals are digital (voice will be sampled to 64 kb/s at the user site) and transmitted over individual B channels. They can be switched by either a digital PSTN 115 or packet switching backbone network 120 as shown in FIG. 1A. In this case, ISDN has the following limitations: (1) The transmission rate over the ISDN line (i.e., from IDSN Network Terminal 110A to 110B) is fixed and cannot be expanded (e.g. basic rate ISDN is 128 kb/s and primary rate ISDN is 1536 kb/s). For high performance services such as video conferencing or graphic file transfers, this data rate is not useful and/or it takes too long in time to transfer. (2) Voice traffic is carried via 64 kb/s PCM or one B-channel. Compared to a typical basic rate access of 2 B-channels, voice connection consumes a large portion of the total bit rate. (3) The protocol for connection over packet-switching backbone network 120 is standardized and requires the other end to follow the same protocol. For ADSL access where transmission rates are in the order of Mb/s, use of a large number of B channels (i.e., multiple ISDN connections) is practically undesirable due to the cost of multiple fixed switched connections. Furthermore, even though the ADSL transmission rate is high, it may not require a constant transmission rate (as is provided by a typical ISDN direct switched connection) all the time for many practical applications such as Internet access.

To overcome the above problems, packet switching (in contrast to circuit switching) based solutions for xDSL such as ATM and Frame Relay have been proposed. The term "xDSL" generally refers to a superset of various digital subscriber loop technologies, including ADSL, HDSL, etc. In particular, WANs (as used herein, "WAN" refers to any packet-switching based network such as Frame Relay, ATM, or SMDS (Switched Megabit Data Service)) can provide packet-switched based connections at variable rates and have been proposed to support xDSL. An example of a WAN arrangement 180 is shown in FIG. 1B. In this arrangement, connections at a rate other than multiple 64 kb/s between two CPEs 130 and 132 can be established through WAN backbone data network 160 at a lower cost due to bandwidth sharing. Because they are very suitable for data transfer, these types of high-speed backbones have been widely used in LAN interconnections as well. However, they do not guarantee fixed transfer delay. Therefore, they are not suitable for time-sensitive services such as video conferencing. In addition, they require non-trivial network access setups. As a result, they are difficult for ordinary users to install and maintain. To terminate an xDSL line 125 and connect it to a WAN 160, a piece of equipment called DSLAM (DSL Access and Multiplexer) 140 is used. As shown in FIG. 1B, a DSLAM splits a subscriber loop 125 to a PSTN 150 for analog voice signals and the WAN 160 for data transmission. As shown, however, the above DSLAM based architecture has the following known limitations. (1) Data transmission always goes through the same backbone data network 160. It is desirable to be able to use the PSTN 150 for switching time-sensitive services. (2) As a result, this type of arrangement does not support end-to-end circuit switching other than Plain Old Telephone Services (POTs), and data communications using voice-band modems. This prohibits the use of the current suggested DSL "modem model" in which end-users at CPE 130 can "dial-up" any remote site 131, 132 with a compatible modem user model. Instead, users need to set up all the necessary network addresses for both the host and intermediate nodes. This can be troublesome for most end users and especially a problem when the network needs to be upgraded (i.e. the network is no longer transparent to users). (3) It does not have the ability to split the data signals carried by the xDSL 125 into two paths: one through the PSTN 150 and one through the WAN 160. The access to the WAN 160 needs to support the maximum xDSL rate. If not, the high-speed transmission over the DSL becomes wasted. On the other hand, the access cost to the WAN for this type of data rate can be expensive. This poses a challenging problem for the carriers to price xDSL access.

Furthermore, the cost of DSL codecs and access equipment are currently much higher than that of voice-band modems. Therefore, even though the speed is much higher than the current 33.6 kb/s or 56 kb/s, most end-users will not afford to upgrade this new technology. A lower cost alternative is thus desirable that users can spend less initially for a lower speed and upgrade it at a later time as demands increase.

In addition to the equipment cost, xDSL users will have to spend much more for the access to a high-speed backbone network. In contrast to the current case where modem users do not need to pay any additional cost, this poses another barrier for adoption of xDSL technology. Users who subscribe to Frame Relay or T1 access typically need to spend $1,000 or even more every month, a figure which is beyond the means of the majority of potential users of such technology.

A critical need, therefore, exists for a solution that minimizes accesses charges while at the same time allowing carriers to enjoy a reasonable commercial return on their investments in higher end equipment to provide ADSL, services. To address this need, a forward compatible and expandable xDSL modem or so-called "SAM" (scaleable ADSL modem) has been proposed as a low cost solution at the end-user side in pending U.S. application Ser. No. 08/884,995 filed Jun. 30, 1997 entitled "Rate Adaptable Modem With Forward Compatible and Expandable Functionality and Method of Operation," also assigned to the present assignee. The invention of that SAM disclosure makes it possible for downstream users to avoid the cost associated with an expensive ADSL modem when they do not need full ADSL transmission rate. In an analogous fashion, it would be attractive and advantageous to extend some of the principles of the above SAM disclosures to the upstream sites. In other words, the central office should be able to effectuate an end-to-end architecture that: (i) permits users to only pay carriers a fee necessary to procure a particular desired target data rate (which may be only a fractional portion of a full ADSL data link); (ii) allows users to establish a particular kind of data link (real-time or delayed); (iii) allows users to accept the lowest cost per unit of bandwidth; or (iv) facilitates a data route which is more suited to particular user's connection model.

SUMMARY OF THE INVENTION

Accordingly, an object of the present invention is to provide an end-to-end architecture and system that permits users to flexibly, transparently, and dynamically configure high-speed connections based on criteria such as their particular data rate needs, associated costs of using various data paths, bandwidth availability, access costs, and suitability to the user's connection model.

Another object of the present invention therefore is to provide an access and multiplexing circuit for use in a central office that permits a user to configure and control an end-to-end connection, including a target data rate, via either the current digital PSTN, a packet-based WAN interconnection, or a digital cross-connect.

A further object of the present invention is therefore to provide a flexible and efficient access and setup process for permitting DSL users to configure and control an end-to-end connection, including a target data rate and connection path via either the digital PSTN, a packet-based WAN interconnection, or a digital cross-connect.

Yet a further object of the present invention is to provide an end-to-end connection that is still nevertheless backwards compatible with existing subscriber loop access protocols and is also forwards compatible with proposed partial DSL bandwidth CPE/ISPs at downstream sites;

Yet another objective is to provide a new DSLAM architecture that allows users to incrementally pay for the access fee according to their speed and service requirements.

The objects of the present invention are effectuated by providing a system that establishes an end-to-end data path connection between a data link requesting site and a destination site based on a data route request provided by a user at the origination site. At the central office site, an interface circuit receives voice, data, and the data route request signals from a digital subscriber loop (DSL) coupled to the user's device at the origination site. A data routing control circuit then evaluates and sets up a data route between the origination site and the destination site using the most optimal data path matching the user's request. This data path can include any one or more of the following: (i) a circuit switched PSTN; and/or (ii) a wide area network (WAN); and/or (iii) a digital cross-connect. Other data paths compatible with a PSTN and WAN are also possible. After the link is established, an access router is then used for routing the user's data through the selected data path.

Each of the various data paths has its transmission characteristics, including among other things, a maximum data rate, transfer delay, cost per unit bandwidth, connection model, etc. In the data route request, the user can specify any requirements for these and similar parameters, and the routing control circuit determines which of the available paths most conforms to such request, thereby effectuating a data path most suited for the user's needs. For example, if a very high speed link is required (in excess of 128 Kbs), a WAN may be selected, so long as the other user defined constraints are met by such data path. This type of data path optionally transfers data using any or all of the following: frame relay, and asynchronous transfer mode (ATM). In determining the data transfer rate of any path, the system also takes into consideration the capabilities of any digital subscriber loops coupled to the various communicating sites, as well as the data processing capabilities available at these sites. For time delay sensitive applications, such as video teleconferencing, a switched network, such as the PSTN may be used instead. This can be achieved by setting up one or more dedicated 64 Kb/s links. Similarly, if low cost is the most important specified criterion in the request, the system can also dynamically determine and select the data path having the lowest cost per unit of bandwidth at the time of the request.

In a preferred embodiment of this system, the interface circuit also separates the data into voice signals and DSL signals. A pulse code modulation circuit then converts the voice signals into digital voice signals for routing through the switched network. The access router is coupled to all the available data paths, including (i) a circuit switched PSTN; (ii) a wide area network interface circuit; and (iii) a digital cross-connect interface circuit.

An access and setup process is also described for accessing and configuring a variety of optimal end-to-end data path modes, including end-to-end switching through a PSTN, end-to-end switching through a WAN, and through an "always-on" type connection. First, a user initiates a connection and transmits an access request to a local central office. The access request can include information concerning a requested data route, target data rate, user connection model, desired cost for the transmission, etc. At the central office, determination is made concerning whether the access request is related to voice signal transmission or a data signal transmission. Based on the parameters of the request, a data route is configured to accomplish the data transfer. The access request can specify a particular data path, or alternatively, can specify that a DSLAM circuit in the central office should select a particular access mode (i.e., the most optimal data path matching the access request requirements) for transmitting data.

In an embodiment where an end-to-end connection is requested through the PSTN, a data path at a data rate of some multiple of 64 kb/s can be set up for applications, which, for example, require realtime performance. After requesting a data path at a particular target rate requested by the user, an evaluation is made of the line qualities between the CO and the communicating sites to ascertain the target rate. The PSTN then allocates and sets up multiple available 64 kb/s connections to try and satisfy the target rate transmission. Thereafter communications can proceed between the two sites at such rate.

In another embodiment where an end-to-end connection is implemented through a WAN, a data path at a certain target data rate can be set up for applications which require a higher data rate, or as is often the case, a lower cost per unit of bandwidth. As above, after requesting a data path at a particular target rate, an evaluation is made of the line qualities between the CO and the communicating sites to ascertain the target transmission rate. The WAN then allocates and sets up sufficient bandwidths to try and satisfy the maximum target transmission data rate. Thereafter communications can proceed between the two sites at such rate.

In applications where a permanent, "always on" DST, connection exists to the central office, a slightly different process can be used. First, to start the connection (turn it on initially) a negotiations procedure is effectuated which determines the highest achievable rate X available through the DSL connection. A WAN having a particular available rate Y is used for effectuating the end-to-end packet-switching connection (i.e., by Frame Relay or ATM) at a rate which is the lesser of X and Y. In the case where Y is smaller than X, a reduced rate Y is proposed to the origination site, which can accept such proposal, or reject the request. A similar negotiation procedure is effectuated at the destination site to determine the maximum rate achievable by that site's DSL. If both sites confirm the request, an end-to-end connection is established for data transmission.

The architecture of the present system combines current DSLAM functions (ATM and/or Frame Relay accesses) with user-configurable end-to-end circuit switching capability. That is, users can decide the rate and ask for connection via either the current digital PSTN packet-based WAN interconnection, or virtual permanent DCS connections. The choice they make can be based on their particular service requirements and the cost they are willing to pay for such service on a call by call basis. The present invention can be loaded directly on top of preexisting switching network infrastructures, and furthermore, permits carriers to more easily allocate the cost of routing data in a manner proportionate to the service requested by a user. For example, an appropriate cost allocation can now be made for delay-sensitive services that require direct switched connections, as opposed to non-delay sensitive services, such as Internet access, which only require packet switching (or the like) connections. Therefore, it provides a smooth migration for all current modem, ISDN, and LAN users. Furthermore, when used in combination with a SAM type transceiver at the end-user side, it provides a very low-cost, end-to-end solution for users who need only connections at a data rate around several hundred kb/s but want to reserve the option of upgrading to a higher performance standard at a later time.

BRIEF DESCRIPTION OF THE DRAWINGS

FIG. 4B is a flow chart illustrating a call setup process for setting up an end-to-end connection through the PSTN in accordance with the present disclosure.

DETAILED DESCRIPTION OF THE INVENTION

Architecture of the Present Invention

Figure 1A:
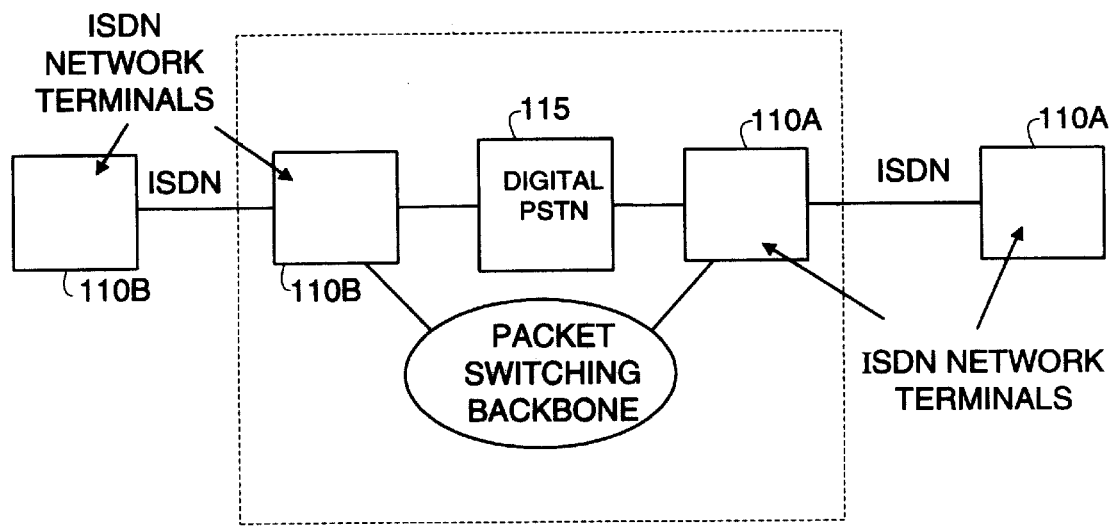
FIG. 1A is a block diagram depiction of a prior art ISDN end-to-end switching network.
Figure 1B:
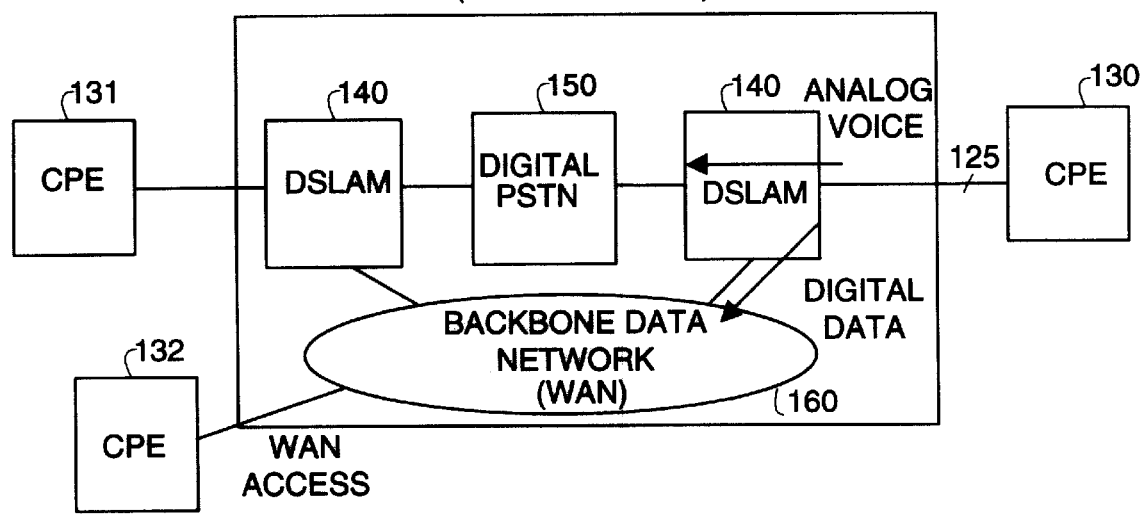
FIG. 1B is a block diagram depiction of a prior art based end-to-end switching network.
Figure 2:
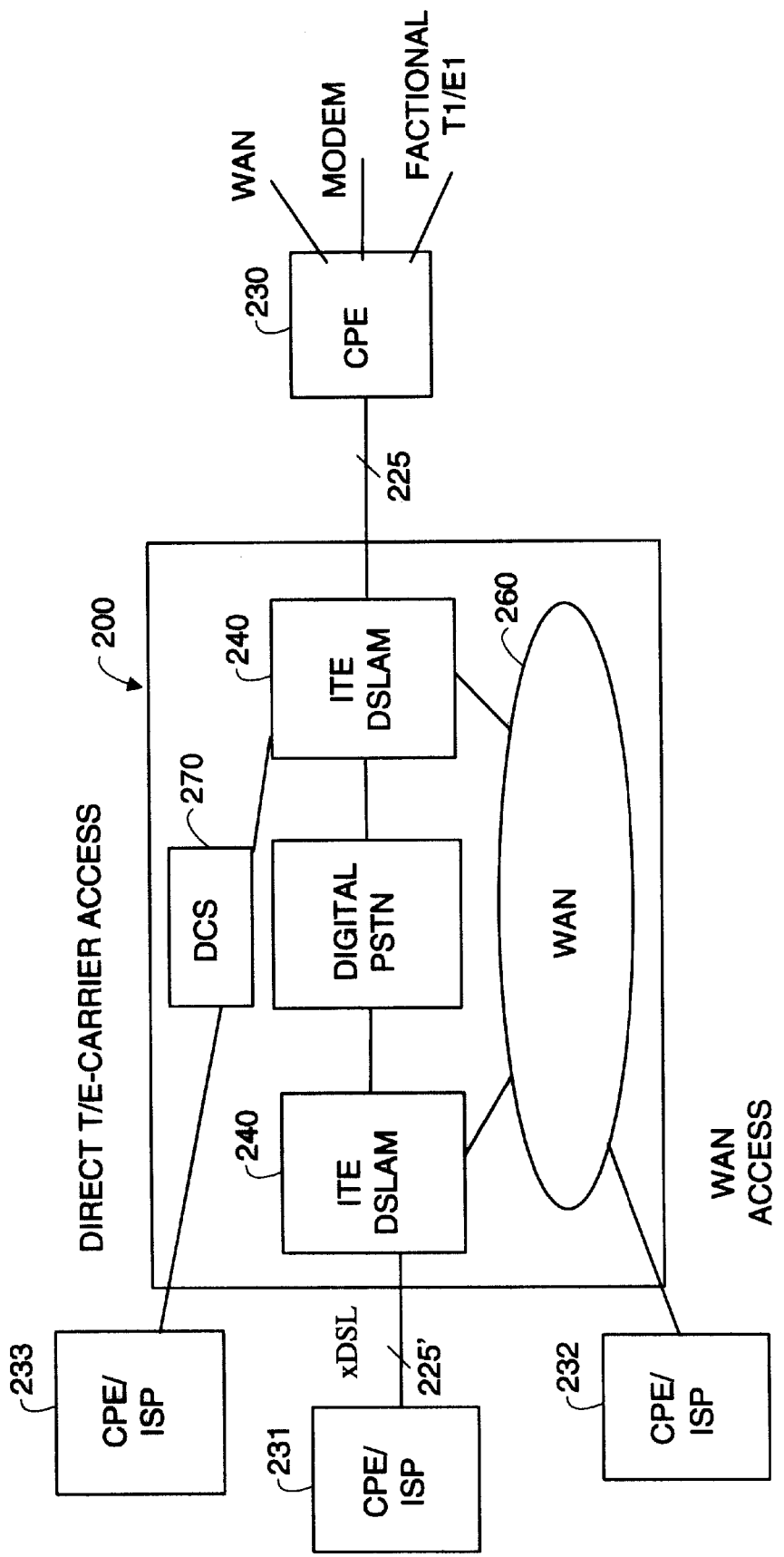
FIG. 2 is an electrical block diagram depiction of a switching network constructed in accordance with the teachings of the present DSLAM invention.

FIG. 2 illustrates the new overall end-to-end DSL access switching network 200 proposed by the applicants. The primary highlight of the present invention is an improved DSLAM 240, which provides connection of a DSL line 225 to all data paths within the switching network 200, including PSTN 250, WAN 260, and various digital cross-connects (DCS) 270. Except where noted, DSL, line 225, PSTN 250, WAN 260, and CPE/ISPs 230, 231, 232, 233 etc., correspond generally to their well-known counterparts already discussed in connection with FIGS. 1A and 1B.

As described herein, the circuitry of DSLAM 240 effectuates the following operational characteristics:

(1) A high speed DSL line 225 can be connected to PSTN 250, WAN 260, and DCS 270 at the same time by splitting its data stream according to user requirements and available connections;

(2) An end-to-end circuit-switching link between downstream CPE 230 and remote CPEs 231, 232, 233 can be established by connecting multiple 64 kb/s lines through PSTN 250. The total speed can be increased as the DSL line speed increases, and as the user at CPE 230 desires to augment data rate capacity. This capability provides satisfactory connections for time-sensitive services such as video conferencing.

(3) When the PSTN data route is used (i.e., using a direct switched connection through PSTN 250), users can operate the DSL line 225 as is done with current conventional modem usages. The primary difference using the present invention is a higher speed line. This minimizes the effort for users to upgrade to xDSL by avoiding unnecessary network setups.

(4) When the WAN route is used (i.e., using a packet switched connection through WAN 260), users can operate the DSL line either as the current modem use with new invented DSLAM features to be described shortly, or as a virtual connection through standard packet switching setup protocols.

(5) Multiple access protocols are supported over the same DSLAM interface 240, which provides gateway functions to route DSL traffic to either PSTN 250 which is circuit-switched or WAN 260 which is based on Frame Relay, ATM, etc.

(6) Depending on the cost of access through the PSTN 250 and WAN 260, users can select the most economic connection at the given data rate and the service requirement. For example, when users need only 128 kb/s transmission, it would be more cost-effective to use the PSTN 250 than WAN 260. On the other hand, for very high-speed data transmission, it would be more cost effective to use the WAN 260 for its bandwidth sharing nature.

(7) When the present invention is further integrated with a SAM type downstream transceiver at the CPE, users can start with a lower data rate (several hundred bits/sec) access and then increase it as needed.

Figure 3:
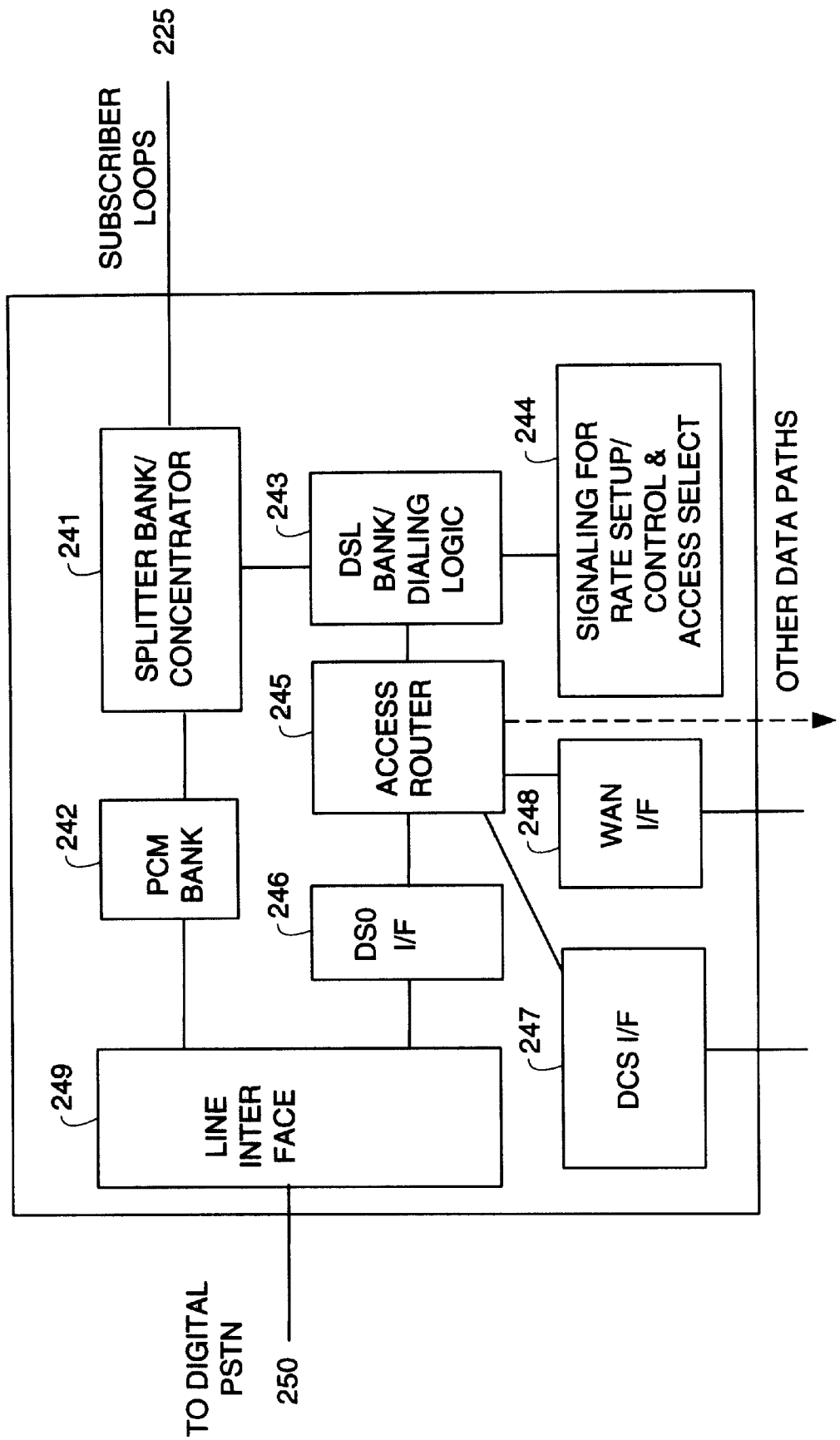
FIG. 3 is an electrical block diagram of a DSL Access and Multiplex (DSLAM) circuit implemented using the teachings of the present invention.

A detailed block diagram of the DSLAM 240 architecture is shown in FIG. 3. Splitter Bank/Concentrator circuit 241 interfaces to a number of subscriber loops 225 which concentrates and then splits the physical signals on such loops to (1) a PCM bank 242 for voice calls or analog modem connections and (2) to a DSL Bank/Dialing Logic block 243 for DSL access. By concentrating the subscriber loops 225, the number of PCM and DSL codecs in stages 242, 243 can be reduced. PCM Bank 242 in the DSLAM is unique to the present invention, and is not used in any prior art DSLAM circuits known to the applicants. Instead of forwarding analog voice signals directly to phone switch 250, voice signals are first converted to PCM. This allows either T or E-carrier interface to switch 250, which increases the cost effectiveness and permits a standard interface to a digital switch.

DSL Bank/Dialing Logic circuit 243, depending on the DSL codec being used, converts DSL signals to digital data signals that can be routed to the various data paths described below. This circuit also provides the necessary processing during call setup and tear down (both discussed in more detail below). Signaling for Rate Setup/Control and Access Select circuit 244, based on the signaling exchanged with remote site 230, controls Access Router 245 and determine how the user data stream will be routed. For example, it negotiates the final data rate with the remote user, and decides the connection method (dialing up the destination as current modem use via either the PSTN 250 or WAN 260, or setting up a virtual circuit via the WAN). Access Router stage 245 routes the data streams to three main possible routes: DS0 interface 246, DCS interface 247, and WAN interface 248. In this manner, a single DSL connection can be connected to multiple routes at the same time. DS0 Interface circuit 246 converts DSL bit streams into multiple B-channels (called DS0 in digital telephone networks) and multiplexes them to either T or E-carrier signals, which are then connected to the PSTN via Line Interface 249. WAN Interface 248 provides the interface between DSL data streams and WAN 260. DCS Interface 247 provides the interface between DSL data streams and DCS for virtually permanent T or E-carrier connections. By virtually permanent it is meant that a circuit connection is set up by provision instead of user-dial-up. As with PCM Bank 242, the Access Router 245, Access Select 244, DS0 Interface 246, and DCS interface 247 are unique aspects to the present DSLAM 240 invention.

Given the description above, the general design of the various stages within the new DSLAM circuit 240 required to accomplish the above functions is a routine task well within the abilities of one skilled in the art. The specifics of such implementation are not critical or essential to the present inventions, and will vary from application to application according to system designer requirements.

The novel DSLAM architecture described, combined with DSL connections, can provide the following service needs:

(1) End-to-end dialing via circuit switching. This is attractive for low bit rate DSL access when used with a downstream SAM architecture at CPE 230, as disclosed in the aforementioned applications noted above, or for time sensitive services such as video conferencing.

(2) End-to-end dialing via packet switching. This data path is most attractive for remote access users do not need real-time services or need very high data (bit) rates.

(3) Access to WAN 260 for high speed, but non-time sensitive services such as Internet access. This type of connection is attractive for users having a network access model, rather than a modem access model at their particular CPE access site.

(4) Virtual permanent connections for corporate users. This feature permits connections by users (usually corporations) whose destination sties can be accessed via T or E class carrier services. The DSLAM architecture described above is a superset of current prior art DSLAM implementation. In other words, the architecture supports all the necessary functions of current prior art DSLAMs, and is therefore backward compatible with existing systems using DSLAMs. Depending on cost constraints, DSLAM 240 can also be implemented without including the features and advantages conferred by some stages such as DCS interface 247 and DS0 interface 246. Again, this flexibility permits carriers to build systems that are more specifically tailored to their particular cost/functionality targets.

Signaling and Call Setups for End-to-End Connections Using the Present Invention A description of how the present invention can be used to negotiate rate and establish end-to-end connections for both circuit-switching and packet-switching now follows.

Figure 4A:
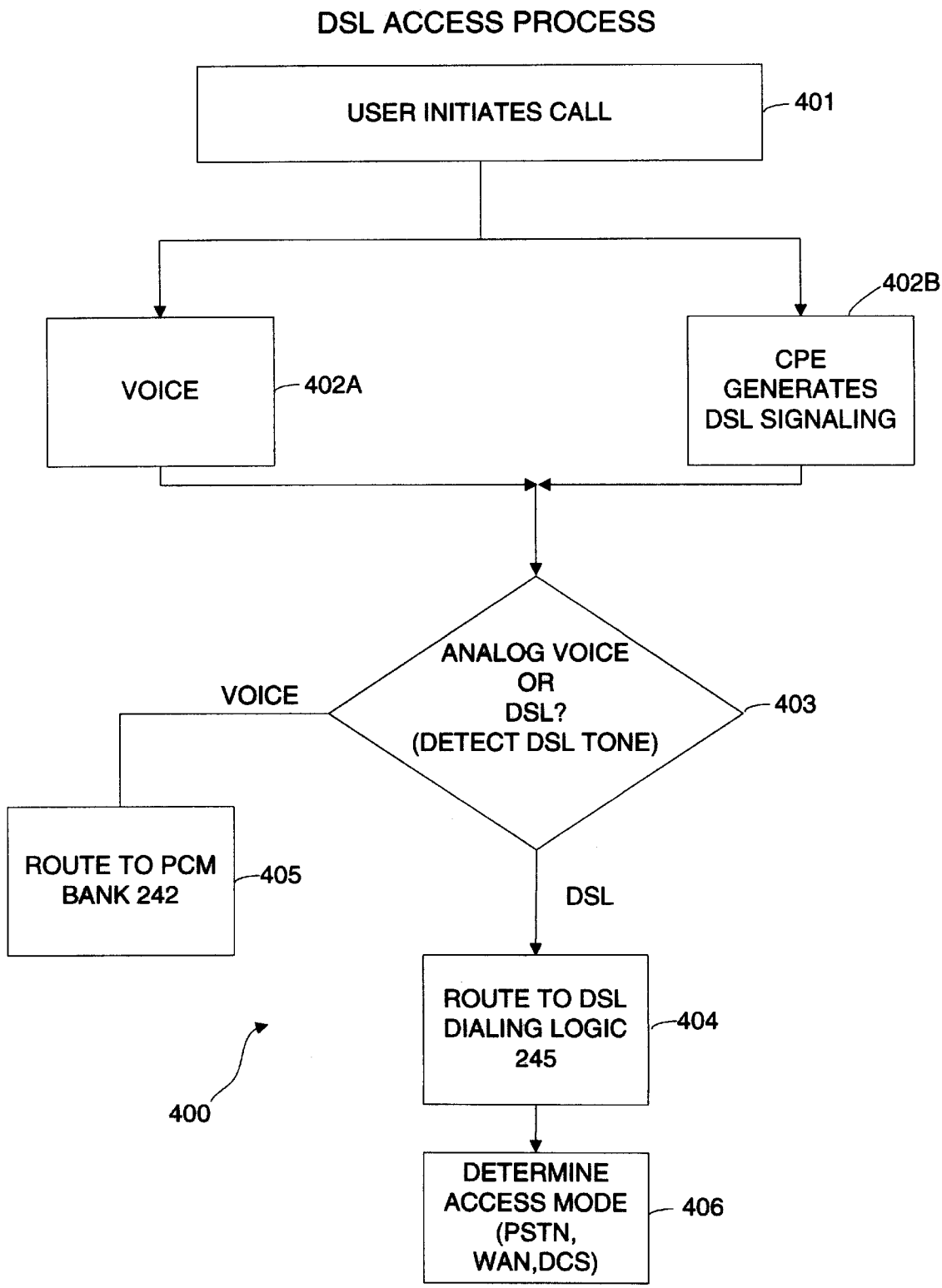
FIG. 4A is a flow chart illustrating an access setup process for setting up an end-to-end connection through either a PSTN, DCS or WAN in accordance with the present disclosure.

The initial DSLAM access procedures are described first with reference to the flowchart shown in FIG. 4A.

At step 401, a remote user at CPE 230 calls a central office site over its DSL, 225, initiating either a voice connection at 402A, or a DSL connection at 402B. If it is a DSL access, a DSL signal (which can be arbitrarily specified) from the remote DSL unit 230 is generated at step 402B. DSLAM 245 then determines at step 403 whether the call is an analog voice signal or a request for DSL, access by detecting the presence of the specified DSL signal. If it is a DSL call, at step 404 DSLAM 245 routes the DSL data to DSL Bank/Dialing Logic circuit 243. If it is the DSL signal is not detected, DSLAM 245 instead connects the analog voice signal to PCM bank 242 at step 405.

After the DSL signal is connected to DSLAM 240, route selection signaling is sent by the caller at 230 over the DSL carrier and received by DSLAM 240 to direct Access Router 245 at step 406 to select a particular access mode (i.e. PSTN 250, DCS 270, or WAN 270).

The above is merely illustrative of a preferred embodiment of performing the access process between the DSLAM 240 and remote user site 230. Other suitable variations will be apparent to skilled artisans given the teachings herein. Again, while this embodiment of the present invention is set out in the context of a DSL based application, it will be apparent to those skilled in the art that above description is merely an exemplary implementation. In addition, there may be other types of data path routes connectable through the DSLAM of the present invention which require data handling other than the circuit and/or packet switching capabilities of PSTN 250 and WAN 260, respectively.

Figure 4C:
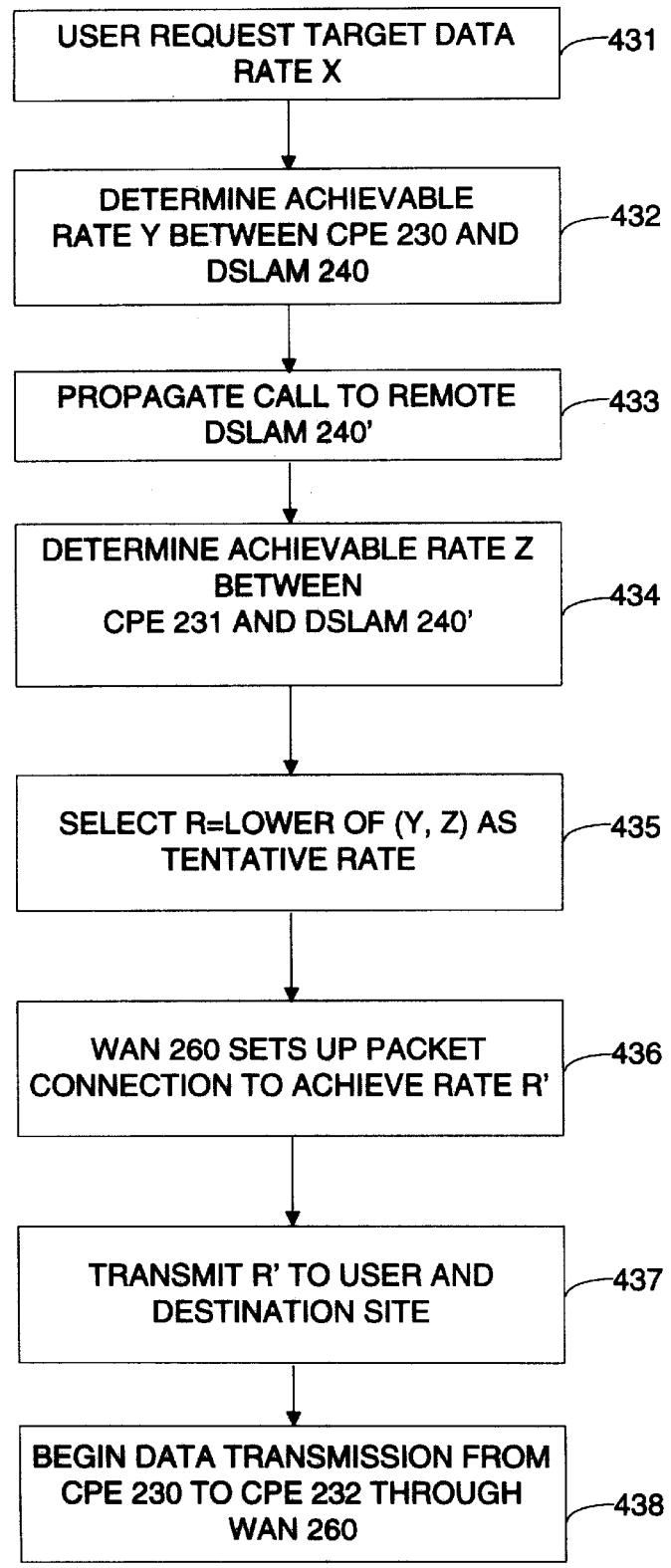
FIG. 4C is a flow chart illustrating a call setup process for setting up an end-to-end connection through a packet switching network in accordance with the present disclosure.
Figure 4D:
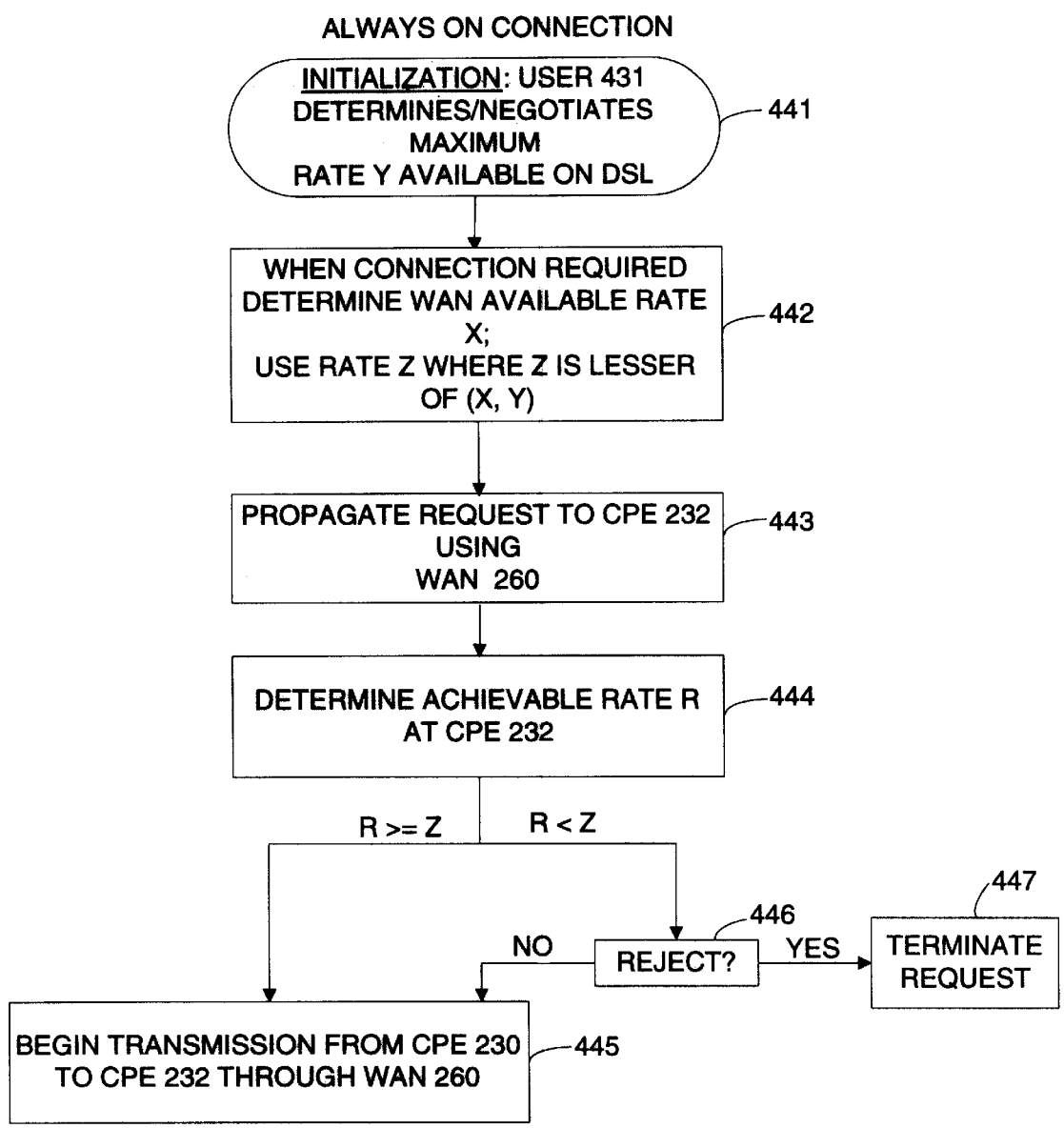
FIG. 4D is a flow chart illustrating a call setup process for setting up an end-to-end connection through an "always on" data channel in accordance with the present disclosure.

A further description of the various call setup process for each of these modes now follows with reference to the flowcharts at FIGS. 4B–4D.

End to End Snatching Through PSTN 250

With reference to FIG. 4B, assuming the user has opted for a routing through PSTN 250, the PSTN call setup process 420 can be used to connect an end-to-end circuit via the PSTN 250 and at a rate of multiple of 64 kb/s. Such routing might be requested, for example, where data transfer is time sensitive and requires real time performance circuit-switching connections. It should be appreciated by those skilled in the art that the 64 kb/s figure is merely typical of that used by central offices at this time, and the present invention is not restricted to such specific adaptations.

(1) At step 421, the user first decides and requests a target data rate X (multiple of 64 kb/s).

(2) The DSL codecs at CPE 231 and DSLAM 245 then decide the available rate Y (Y<=X) at step 422 for DSL 225 by taking into consideration, among other things, the caller requested target rate, line quality of DSL, 225, etc.

(3) During step 423, the call request is propagated to the remote CO associated with destination site CPE 231 where at step 424, DSLAM 240' of the remote CO then calls the DSL of the called party and performs similar rate negotiation process of the above step 422 to determine an available rate Z on DSL, 225'.

(4) Depending on the result of step 424, DSLAM 240 then selects R as the lower of Y and Z at step 425 as the tentative achievable rate for the overall data link.

(5) At step 426, PSTN 250 then allocates and sets up multiple 64 kb/s connections to try and satisfy the above data rate R. However, the maximum number of switching circuits that the PSTN can set up determines the final actual available rate, R' that can be used in the link.

(6) The PSTN 250 then sends the final rate to both the calling and called parties at step 427.

(7) After this, at step 428 the end-to-end connection starts to communicate data from user site CPE, 230 to destination site 231 through PSTN 250.

End to End Switching Through WAN 260

With reference to FIG. 4C, assuming the user has opted for a routing through WAN 260, the WAN call setup process 430 can be used to connect an end-to-end packet-switching link. Such routing might be requested, for example, where the data transfer is not time sensitive, but requires the current modem-use model.

(1) At step 431, the user first decides and requests a target data rate X.

(2) The DSL codecs at CPE 231 and DSLAM 245 then decide the available rate Y at step 432 for DSL, 225 by taking into consideration, among other things, the caller requested target rate, line quality of DSL 225, etc.

(3) During step 433, the call request is propagated to a CO associated with a destination site CPE 231 where at step 434, DSLAM 240' of the remote CO then calls the DSL, of the called party and performs similar rate negotiation process of the above step 432 to determine an available rate Z on DSL, 225'.

(4) Depending on the result of step 434, DSLAM 240 then selects R as the lower of data rates Y and Z at step 435 as the tentative achievable rate for the overall data link.

(5) At step 436, WAN 260 then allocates and sets up the packet connection by trying to meet the above data rate R. However, the maximum number of packets that the WAN can set up determines the final actual available rate, R' that can be used in the link.

(6) WAN 260 then sends the final rate to both the calling and called parties at step 437.

(7) After this, at step 438, the end-to-end connection starts to communicate data from user site CPE 230 to destination site 232 through WAN 260.

End-to-End Path Through An "Always On" Connection

With reference to FIG. 4D, in this case, the DSL connection 225 to the central office is always on. To start the connection (turn it on initially) DSL transceiver at CPE 231 talks to remote DSLAM 240 at the central office at step 441 and negotiates the target rate Y that can be achieved on DSL, 225 based on the loop condition, host processor power at CPE 231, access cost, and the backbone rate support for WAN 260.

Once the DSL connection is on, the end-to-en d packet-switching connection is accomplished using process 440 as follows:

(1) The user can set up a Frame Relay or ATM link through WAN 260. The Frame Relay or ATM network first checks if the rate request Y from the new connection is smaller than the available rate X from the WAN. If not, the requested rate Y is reduced to the available rate X, so that the final Z is the lesser of X and Y.

(2) The requested rate Z is passed over WAN 260 to the destination end 232 at step 442, which will check at step 443 if the request rate Z can be supported by either another DSL link or a WAN connection. If not, the request is either rejected or the request rate is reduced to a rate R that can be supported. The final actual rate R used to set up the connection is based on the protocol of the selected network.

(3) After this, at step 443 the end-to-end connection starts to communicate data from user site CPE, 230 to destination site 232 through WAN 260.

Although the present invention has been described in terms of a preferred embodiment, it will be apparent to those skilled in the art that many alterations and modifications may be made to such embodiments without departing from the teachings of the present invention. For example, it is apparent that the present invention would be beneficial used in any xDSL or high speed multi-carrier application environment. Other types of circuits beyond those illustrated in the foregoing detailed description can be used suitably with the present invention. Accordingly, it is intended that the all such alterations and modifications be included within the scope and spirit of the invention as defined by the following claims.

What is claimed is:

1. A method for setting up a data connection between an originating site communications device and a destination site communications device using a public switched network, said method comprising the steps of:

(a) receiving a request for a target data rate X from said originating site; and (b) determining a maximum available rate Y (Y<=X) available for transmitting data to and/or from said originating site; and (c) determining a maximum available rate Z for transmitting data to and/or from said destination site; and (d) selecting a data rate R, where R is the lesser of {Y, Z} as a tentative achievable rate for the overall data link; and (e) setting up multiple 64 kb/s connections to effectuate said data connection at the selected data rate R.

2. The method of claim 1, further including a step (f): notifying both the originating and destination sites after said data connection is set up.

3. The method of claim 2, further including a step (g): transmitting data between said originating and destination sites at the selected data rate R through said data connection.

4. The method of claim 3, further including a step (h): converting voice signals from the originating site into digital voice signals for routing such signals through a circuit switched network or another data path having minimal data transmission delay characteristics.

5. The method of claim 1, wherein said data includes time sensitive data signals.

6. A method for setting up a data connection between an originating site communications device and a destination site communications device using a packet switching network in a dial-up mode, said method comprising the steps of:

(a) receiving a request for a target data rate X from said originating site; and (b) determining a maximum available rate Y (Y<=X) available for transmitting data to and/or from said originating site; and (c) determining a maximum available rate Z for transmitting data to and/or from said destination site; and (d) selecting a data rate R, where R is the lesser of {Y, Z} as a tentative achievable rate for the data connection; and (e) setting up packet switching links to effectuate said data connection at the selected data rate R.

7. The method of claim 6, further including a step (f): notifying both the originating and destination sites after said data connection is set up.

8. The method of claim 7, further including a step (g): transmitting data between said originating and destination sites at the selected data rate R through said data connection.

9. The method of claim 8, further including a step (h): converting voice signals from the originating site into digital voice signals for routing such signals through a switched network or another data path having minimal data transmission delay characteristics.

10. The method of claim 6, wherein said data includes non-time sensitive data signals.

11. A method for setting up a data connection between an originating site communications device and a destination site communications device using a digital subscriber loop that is coupled to a central office in an always-on mode, said method comprising the steps of:

(a) initializing the data connection between the originating and destination sites, including determining a maximum data rate X capable of being achieved between said sites; and (b) receiving a requested data rate Y for transmitting data to and/or from said originating site; and (c) setting up a packet switched connection for transmitting data to and/or from said originating site;

(d) determining a maximum available rate Z for transmitting data using the packet switched connection, where Z is the lesser of {X, Y} as a tentative achievable rate for the overall data link; and (e) determining a rate R' which can be supported by data links coupled between said central office and said destination site;

(f) determining a rate R, where R is the lesser of {R', Z} as a tentative achievable rate for the overall data link; and (g) setting up multiple data packets to effectuate said data connection at the selected data rate R.

12. The method of claim 11, further including a step (h): notifying both the originating and destination sites after said data connection is set up.

13. The method of claim 12, further including a step (i): transmitting data between said originating and destination sites at the selected data rate R through said data connection.

14. The method of claim 13, further including a step (j): converting voice signals from the originating site into digital voice signals for routing such signals through a switched network or another data path having minimal data transmission delay characteristics.

15. The method of claim 14, wherein said data includes non-time sensitive data signals.

16. The method of claim 11, wherein during step (a), the maximum data rate X is determined by evaluating the following parameters: (i) transmitting conditions of said subscriber loop; (ii) processing capabilities at said originating site.

17. The method of claim 16, wherein the rate R' is determined by evaluating the following parameters: (i) transmitting conditions of a subscriber loop coupled to said destination site; and (ii) processing capabilities at said destination site.

18. The method of claim 17, wherein R is selected based on access costs associated with the data connection.

19. The method of claim 18 wherein Z is determined by evaluating a backbone data rate support available for a packet switching network to be used for said data connection.

20. The method of claim 14, wherein time sensitive data signals from the originating site are not routed through the packet switched connection.

* * * * *